United States Patent [19]

Gray et al.

[11] Patent Number: 5,445,109

[45] Date of Patent: Aug. 29, 1995

[54] SELECTIVE BIRD FEEDER

[76] Inventors: Donald F. Gray, 5992 Seymour Rd., Owosso, Mich. 48867; Louis N. Sparling, 3008 13th St. West, Palmetto, Fla. 34221

[21] Appl. No.: 274,989

[22] Filed: Jul. 13, 1994

[51] Int. Cl.⁶ .............................................. A01K 39/01
[52] U.S. Cl. ................................................. 119/57.9
[58] Field of Search ............... 119/52.1, 52.2, 52.3, 119/52.4, 57.8, 57.9

[56] References Cited

U.S. PATENT DOCUMENTS

| Re. 32,970 | 7/1989 | Furlani . | |
|---|---|---|---|
| 2,856,898 | 10/1958 | Doubleday et al. . | |
| 4,541,362 | 9/1985 | Dehls . | |
| 4,646,686 | 3/1987 | Furlani | 119/57.9 |
| 5,048,461 | 9/1991 | Wessner . | |
| 5,105,765 | 4/1992 | Loken . | |
| 5,156,112 | 10/1992 | Brown . | |
| 5,163,382 | 11/1992 | Morrison | 119/57.9 |
| 5,195,459 | 3/1993 | Ancketill | 119/57.9 |
| 5,289,796 | 3/1994 | Armstrong | 119/52.3 |

*Primary Examiner*—Thomas Price
*Attorney, Agent, or Firm*—Learman & McCulloch

[57] ABSTRACT

The selective bird feeder (10) has a bird feed container (12) and a bird feed container cover (70). The bird feed container (12) has an open top (24) and bird feed access openings (32). The bird feed container cover has a roof (72) and outer walls (76, 79, 80, and 82). Bird perch assemblies (84, 86) are attached to the outer walls (78, 82). A spring follower (74) with a vertical bore (94) is integral with the bird feed container cover (70). A vertical tube (48) is secured to the bird feed container (12) and extends upward through the vertical bore (94). A cap (108) is attached to the vertical tube (48) by a pin (110). A coil compression spring (68), inside the vertical tube (48), exerts a force on an adjustable lower spring abutment (50) and spring abutment surfaces (104) and (106) on radial projections (96, 98) that are integral with the spring follower (74) and extend through vertical slots (100, 102) in the vertical tube. The coil compression spring (68) normally holds the roof (72) in sealing contact with a stop surface (122) on the cap (108). A large bird or other heavy animal on the bird feed container cover (70) or the bird perch assembly (84 or 86) compresses the coil compression spring (68), moves the bird feed container cover down and covers the bird feed access openings (32).

20 Claims, 7 Drawing Sheets

SELECTIVE BIRD FEEDER

TECHNICAL FIELD

This invention relates to a bird feeder and more particularly to a bird feeder which prevents large birds and other animals from obtaining feed based upon their weight and which is adjustable to change the maximum size bird or animal which is permitted to obtain feed from the feeder.

BACKGROUND OF THE INVENTION

Bird feeders designed to keep squirrels out have been used for many years. Some of these bird feeders keep squirrels out based upon their weight. Bird feeders designed to exclude squirrels have had varying degrees of success. Squirrels have been able to bypass many of the systems designed to keep them out.

There is also a need to keep large birds from feeding at some bird feeders. Large birds can consume large quantities of expensive feed and drive small birds from bird feeders. To keep some birds out while letting other birds feed at a bird feeder requires a consistent and accurate weighing mechanism. Such a mechanism should also be adjustable to allow the owner to determine the maximum size bird that will be permitted to feed at the bird feeder.

Bird feeders should also be long lasting and inexpensive. Current bird feeders are normally fabricated from readily available materials such as pipe and flat sheets of wood, plastic, glass and metal. The fabrication time required makes them expensive. A relatively short useful life is normal. Inexpensive injection molded plastic bird feeders that are long lasting are unusual or even nonexistent. Bird feeders made from wood generally have short useful lives due to water damage and problems with fasteners that hold them together. Plastic bird feeders fabricated from plastic pipe are relatively heavy and have small capacities for bird feed. Bird feeders that include glass or plastic sheet material generally include wood materials too. These feeders have all the problems of bird feeders that are all wood.

Bird feed is primarily grains. Grains can be stored for long periods of time if they have low water content. Most grains will spoil or start to grow in a few days if their water content exceeds about 15%. Many bird feeders allow water to enter the grain storage compartment. Wet grain becomes unfit for animal consumption within hours. Molds and fungus growths which develop in wet grain may be toxic to animals.

Bird feeders generally hold sufficient bird feed to last from a few hours to a few days. The time required to refill bird feeders is an important factor because refilling is required frequently. The filling time is increased by small openings for receiving bird feed and by lids or covers that are difficult to open and close.

Bird feeders are generally designed to be hung from a tree or to be supported from the bottom on a pole. They must be above the ground to protect feeding birds from predators. A few bird feeders can be hung from the top or supported from bottom. Most bird feeders are designed to be supported in only one way and can only be changed to accommodate a different support system with difficulty.

SUMMARY OF THE INVENTION

An object of the invention is to provide a bird feeder that excludes birds and other animals from feeding based on weight with an adjustable, accurate, and reliable weight measuring assembly.

Another object of the invention is to provide a bird feeder with a dry, generally watertight bird feed container.

A further object of the invention is to provide a bird feeder that can be injection molded to reduce cost, increase durability, and extend useful life.

A still further object of the invention is to provide a bird feeder than can be hung from the top or supported from the bottom on a pole.

A yet still further object of the invention is to provide a bird feeder that can accommodate a variety of birds.

The bird feeder includes a bird feed container with a bottom wall, side walls, and an open top. A plurality of feed access openings are provided in the side walls above the bottom wall. A vertical tube is mounted in the center of the bird feed container. A lower spring abutment is mounted in the lower portion of the vertical tube. The vertical position of the lower spring abutment within the vertical tube is adjustable. A compression spring is retained in the vertical tube with a lower end in contact with the lower spring abutment.

A bird feed container cover having a roof and integral walls is provided to cover the bird feed container. The walls of the bird feed container cover extend down from the roof and along the outside of the walls for the bird feed container. A spring follower with a vertical bore is permanently mounted in an aperture in the roof. The vertical tube mounted in the bird feed container passes through the vertical bore in the spring follower. A pair of radial projections projecting radially inward from opposite sides of the vertical bore through the spring follower, extend through the vertical slots in the upper end of the vertical tube. Spring abutment surfaces on the radial projections contact the upper end of the compression spring. A cap with a stop surface is connected to the upper end of the vertical tube by a removable pin.

During normal use the compression spring forces the spring follower upward until the bird feed container cover contacts the stop surface on the cap. In this position the stop surface on the cap is in sealing contact with the bird feed container cover to keep water out and openings in the walls of the bird feed container cover are in alignment with the feed access openings in the bird feed container. When the bird feed container cover openings are in alignment with the feed access openings, birds can set on perches integral with the walls of the bird feed container cover and obtain bird feed through the feed access openings.

A large heavy bird or other animal on the bird feed container cover will move the radial projections on the spring follower downward in the vertical slots in the vertical tube and compress the spring until the walls of the bird feed container cover block access to the feed access openings, The weight required to compress the spring can be adjusted by adjusting the position of the lower spring abutment within the vertical tube, The bird feeder can be hung from the cap at the top or it can be supported from the bottom of the bottom wall of the bird feed container.

Other objects and advantages of the invention will become more apparent from the following description when it is considered in conjunction with the accompanying drawings.

DESCRIPTION OF THE PREFERRED EMBODIMENT

The bird feeder 10 is designed to be injection molded. Injection molding requires molded parts to have a draft or slight taper to facilitate their removal from a mold. The draft is exaggerated in the drawing so that it is clear that the draft exists.

Figures 4, 6:
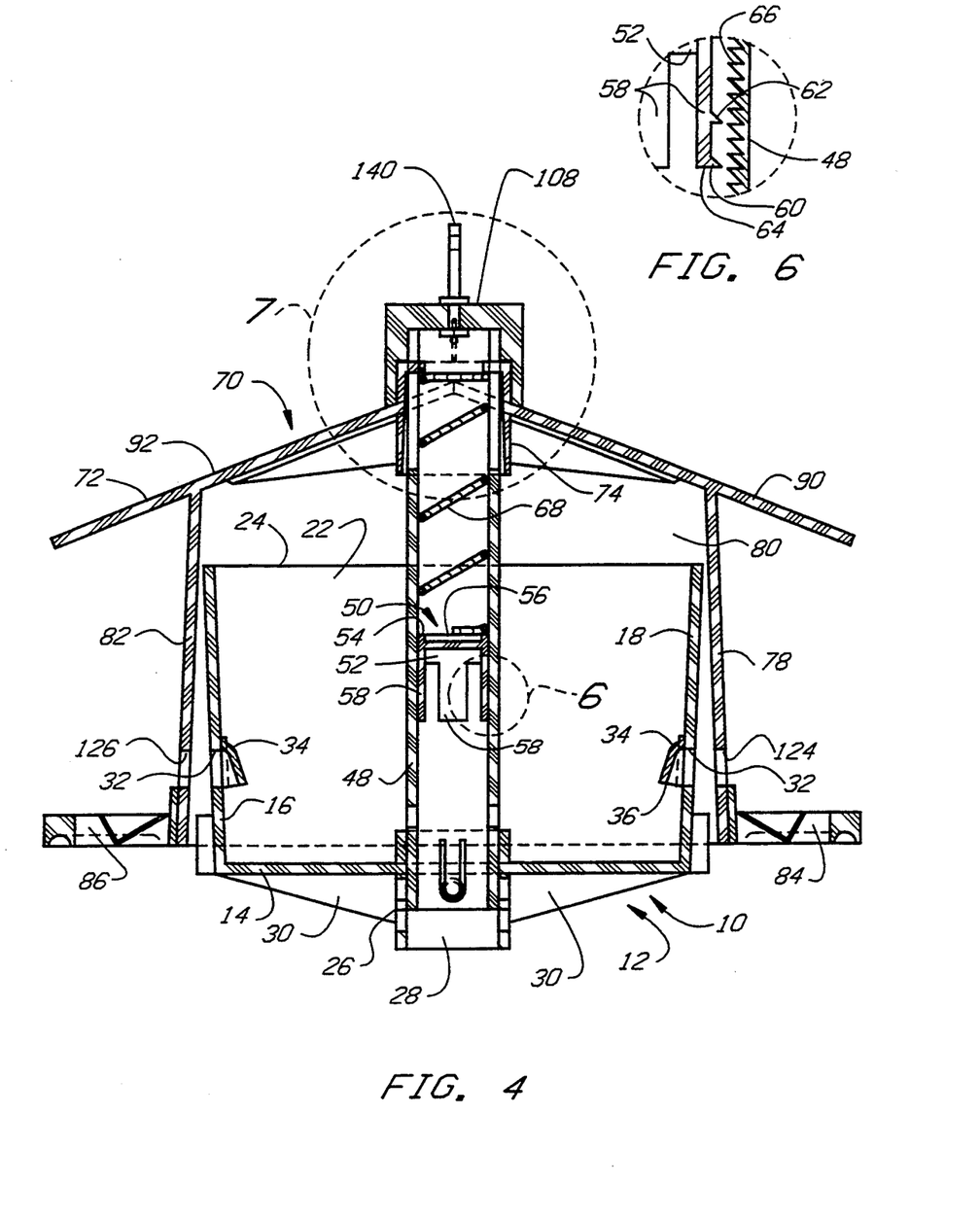
FIG. 4 is a sectional view taken along line 4—4 in FIG. 1.
FIG. 6 is an enlarged sectional view of the lower spring abutment adjustment teeth taken at 6 in FIG. 4.

The bird feeder container 12 has a bottom wall 14, side walls 16 and 18, and end walls 20 and 22. The bottom wall 14, the side walls 16 and 18, and the end walls 20 and 22 are joined together to form an integral container with an open top at the top 24 of the side walls and the end walls. The bird feed container 12 as shown in FIG. 4 is square. The bird feed container 12 could be rectangular, circular, six-sided or some other shape.

A sleeve 26 with a central vertical bore 28 is provided in the center of the bottom wall 14. Gussets 30 are integral with the sleeve 26, the bottom wall 14 and extend from sleeve 26 to each corner of the bird feed container 12. As shown in the drawings, the sleeve 26 extends part way above the bottom wall 14 and partly below the bottom wall. The sleeve 26 could extend only above the bottom wall 14 or only below the bottom wall, if desired. The gussets 30 could be above the bottom wall 14 and hidden inside the bird feed container 12, if desired. The sleeve 26 and the gussets 30 are preferably injection molded together with the bottom wall 14, the side walls 16 and 18, and the end walls 20 and 22.

Bird feed access openings 32 are provided in the side walls 16 and 18 slightly above the bottom wall 14. Two bird feed access openings 32 are shown in the drawing. If desired, there could be more than two bird feed access openings 32 or the number could also be reduced to one. The horizontal length of the bird feed access openings 32 can be increased or decreased as required.. Normally, only one bird feed access opening 32 is employed in one side wall. A skirt 34 at least partially covers the bird feed access opening 32 on the inside of the bird feed container 12 to keep grain from rolling out through the bird feed access openings. The skirt 34 is attached to the inside surface of each side wall 16 and 18 above the bird feed access opening 32 and along both ends of the access opening. The skirt 34 extends downward and inward to create an open space through which a bird bill can project to pick up bird feed. The lower edge 36 of each skirt 34 is preferably at the same height or slightly above the bottom of the bird feed access opening 32. The skirts 34 are attached to the inside surface of the walls of the bird feed container by adhesives or some other fastening system after the bird feed container 12 is injection molded. Alternate skirt fastening systems include mechanical fasteners and friction fasteners. Friction fasteners allow the skirt to be snapped in and removed without tools.

Figure 8:
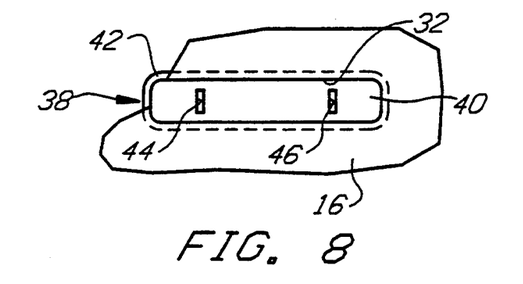
FIG. 8 is an enlarged elevational view of a feed access opening in a wall of the bird feeder container and an optional finch feeder insert with portions of the wall broken away.

Small birds such as finches eat relatively small expensive seeds. The bird feeder 10 can be converted to a finch feeder by securing a finch feeder insert 38 in the bird feed access opening 32. The finch feeder insert 38, shown in FIG. 8, is a flat plate 40 that is the same size and shape as the bird feed access opening 32. An integral flange 42 on the back side of the flat plate 40 contacts the inside surface of the side wall 16 when the flat plate is inserted in the feeder access opening 32. The integral flange 42 can be attached to the inside surface of the side wall 16 by an adhesive or the finch feeder insert 38 can be held in the feeder access opening by mechanical fasteners. A friction retainer system could be provided to allow the finch feeder insert 38 to be snapped into the bird feed access opening 32 and held by friction if removal of the finch feeder insert is required to convert the bird feeder 10 from a finch feeder to a feeder for larger birds. If the bird feeder 10 is to be converted between a finch feeder and a feeder for other birds, the skirt 34 will also have to be removable. The finch feeder insert 38 has small vertical slots 44 and 46 which provide finches access to small seeds. A skirt 34 cannot be employed with the finch feeder insert 38 because small seeds must be in contact with the small vertical slots 44 and 46 for finches to feed.

Figure 1:
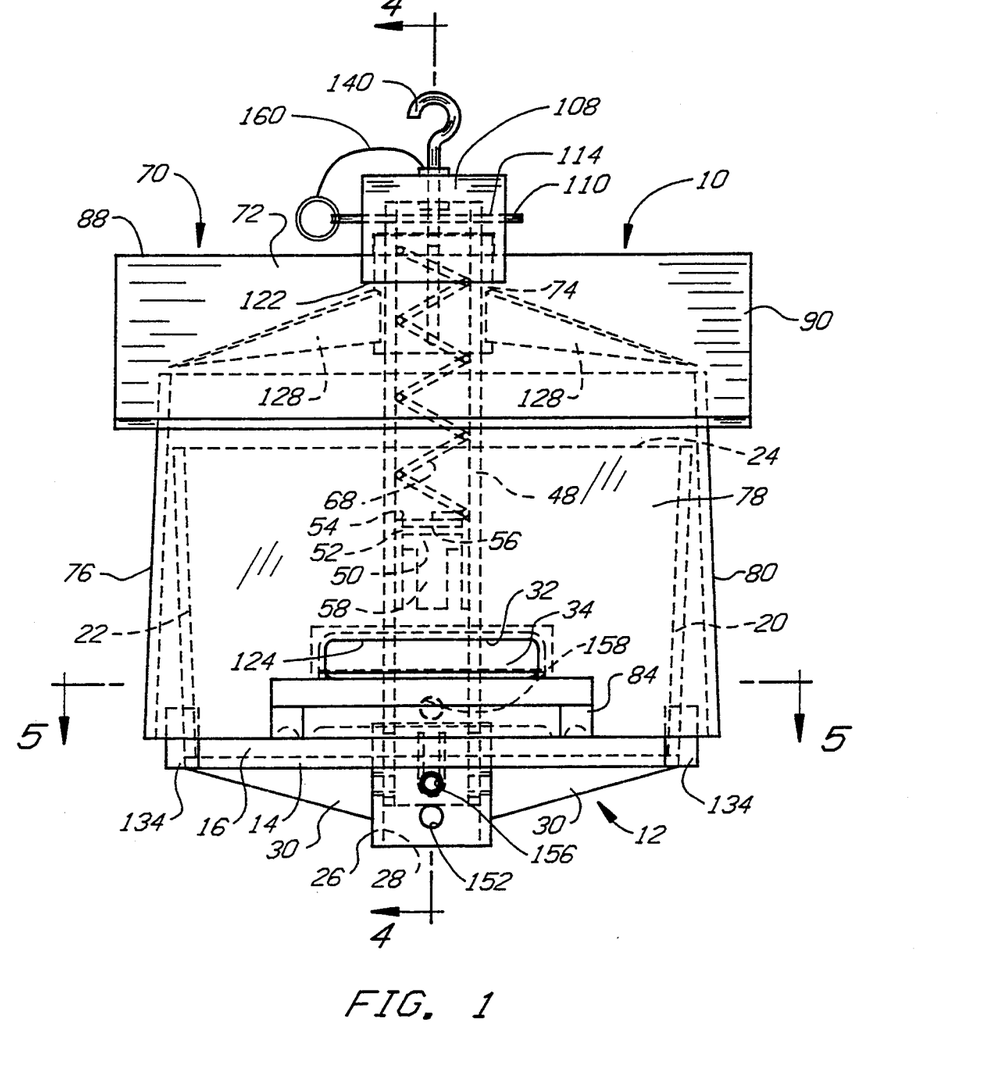
FIG. 1 is a side elevational view of the selective bird feeder.
Figure 2:
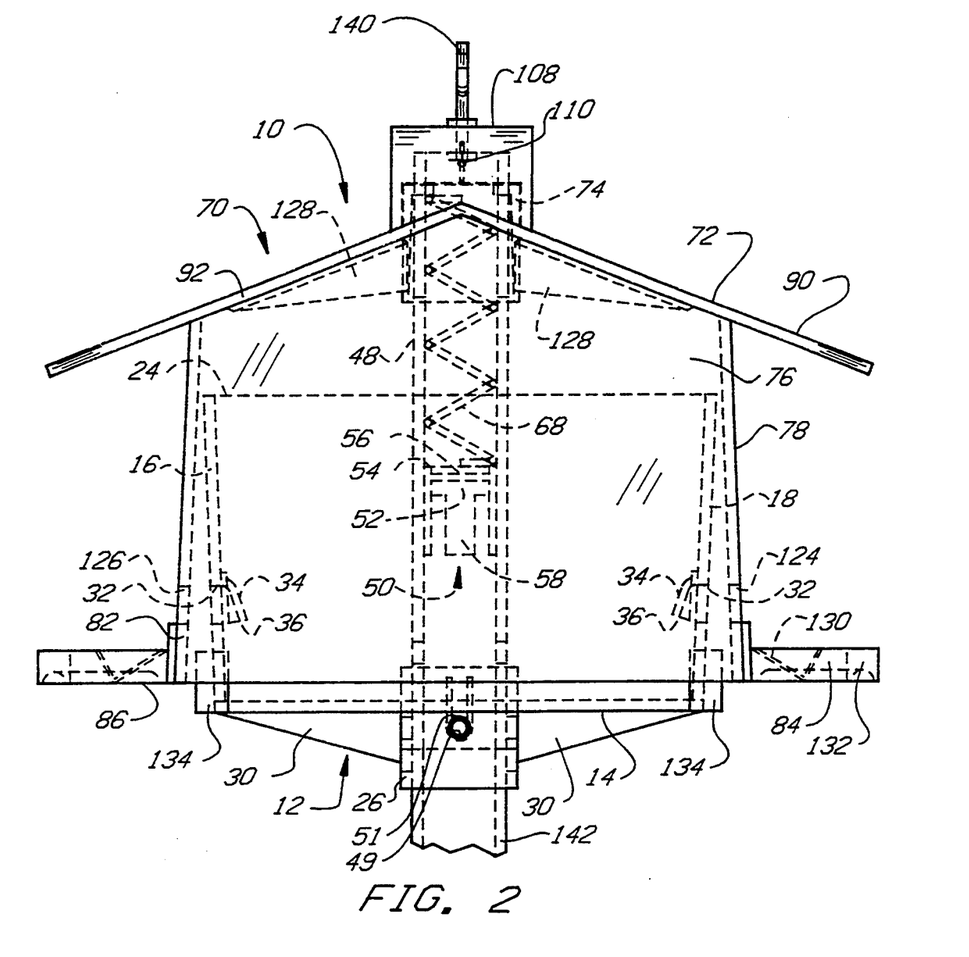
FIG. 2 is an end elevational view of the selective bird feeder.
Figure 3:
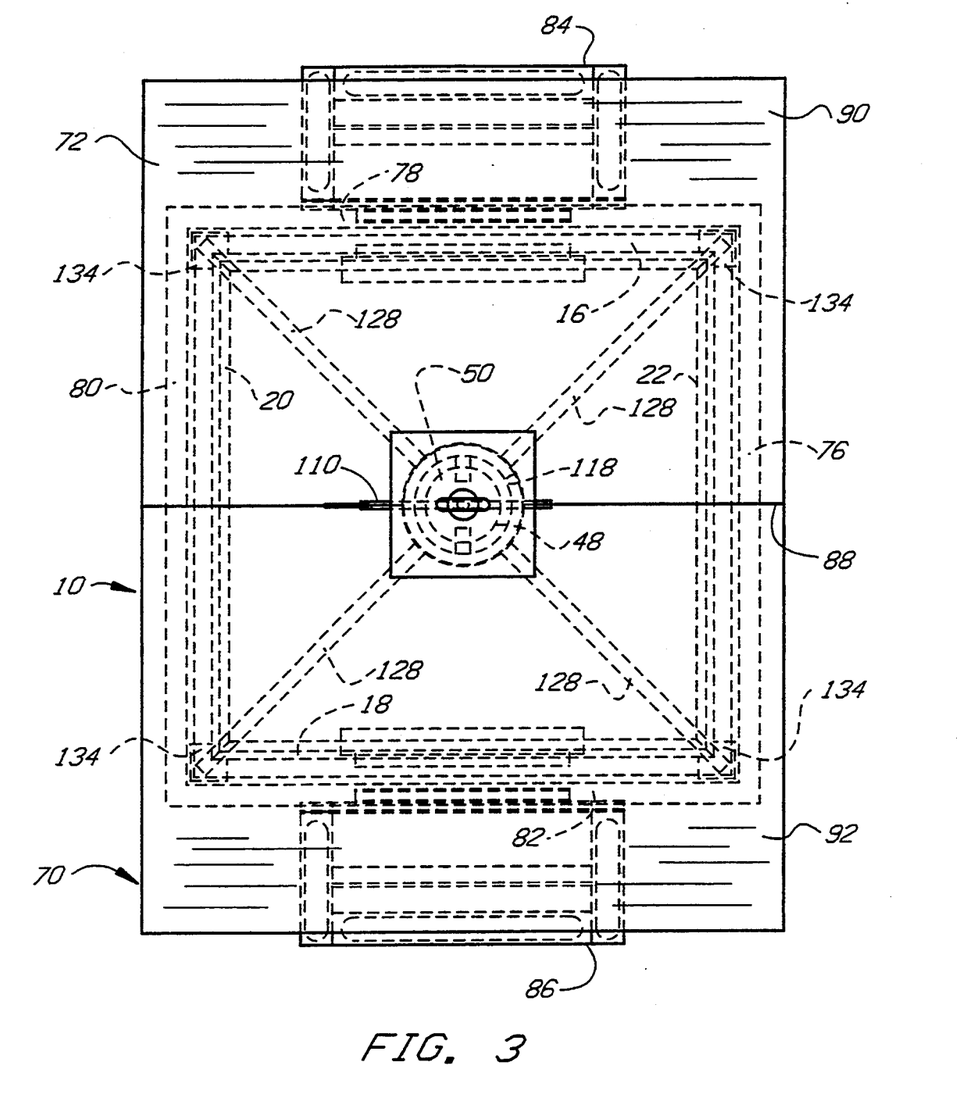
FIG. 3 is a top plan view of the selective bird feeder.

A vertical tube 48 or vertical member is inserted in to the upper end of the central vertical bore 28 through the sleeve 26. An adhesive may be employed to permanently retain the vertical tube 48 in the sleeve 26 and make it a permanent fixed part of the bird feeder container 12. The vertical tube 48 can also be attached to the sleeve by providing a pair of retaining knobs 51, like the retaining knob 150 described below, on the vertical tube spaced 180° from each other. Each retaining knob 51 projects into an aperture 49 in the sleeve 26 and locks the vertical tube 48 in a fixed position relative to the sleeve. The vertical tube 48 extends upward from the sleeve 26 to an upper end that is above the top 24 of the side walls 16 and 18 and the end walls 20 and 22. As shown in FIGS. 1, 2 and 4, the vertical tube 48 extends only part way through the sleeve 26. The reason for extending the vertical tube only part way through the sleeve 26 is explained below.

A lower spring abutment 50 is slideably received within the vertical tube 48. The upper part of the lower spring abutment 50 includes a cylindrical section 52 with an upwardly facing spring abutment surface 54. A horizontal plate 56 integral with the cylindrical section 52 closes the center of the cylindrical section. Four vertical legs 58 extend downwardly from the lower edge of the cylindrical section 52. Two of the vertical legs 58, which are on opposite sides of the lower spring abutment 50 from each other, have teeth 60 on their radially outer surfaces as shown in FIG. 6. The teeth 60 have inclined upper surfaces 62 that are angled downwardly and radially outward and lower horizontal surfaces 64. The horizontal surfaces 64 of the teeth 60 engage teeth 66 on the inside surface of the vertical tube 48 to prevent the lower spring abutment 50 from moving vertically downward in the vertical tube. To adjust the position of the lower spring abutment 50 in the vertical tube 48, a blunt rod is inserted upwardly into the bottom of the vertical tube. Continued upward movement of the rod after it contacts the horizontal plate 56 will move the lower spring abutment 50 upward. Upward movement of the lower spring abutment will cause the incline surface 62 of the teeth 60 to contact the teeth 66 and deflect the vertical legs 58 with teeth 60 radially inward until the teeth 60 disengage the teeth 66 on the inside surface of the vertical tube 48. Upon the lower spring abutment 50 reaching the desired position within the vertical tube 48, the rod can be removed from the vertical tube 48 and the vertical legs 58 with teeth 60 will move radially outward. Radial outward movement of the vertical legs 58 will move the teeth 60 into engagement with the teeth 66 and prevent downward movement of the lower spring abutment 50 relative to the vertical tube 48. The teeth 60, as shown in FIG. 6, are just starting to move into engagement with the teeth 66. Each time the tip of a tooth 60 passes the tip of a tooth 66 a noise will be generated that will tell a person adjusting the position of the lower spring abutment that it has been raised another tooth. If the lower spring abutment 50 is raised too high within the vertical tube 48, the lower spring abutment is pushed upward and out of the vertical tube. The lower spring abutment 50 is then reinserted into the bottom of the vertical tube 48 and raised to the desired height with an adjustment tool or rod. Teeth could be added to the vertical legs 58, that do not have teeth, if required or if so desired.

A coil compression spring 68 is inserted into the vertical tube 48. The lower end of the coil compression spring 68 contacts the upwardly facing abutment surface 54 on the lower spring abutment 50.

A bird feed container cover 70, with an integral roof 72, a spring follower 74, outer walls 76, 78, 80, and 82, and bird perch assemblies 84 and 86, covers the open top of the bird feed container 12 and telescopes over the upper portion of the side walls 16 and 18 and the end walls 20 and 22. The integral roof 72, as shown in the drawings, has a center horizontal ridge 88, a first side 90 in a flat plane that slopes downwardly from a first side of the center horizontal ridge 88, and a second side 92 in a flat plane that slopes downward from a second side of the center horizontal ridge 88. The outer walls 76, 78, 80, and 82 are integral with the roof 72 and extend generally vertically downward from the bottom side of the roof. The outer walls 76, 78, 80, and 82 are slightly longer than the side walls 16 and 18 and the end walls 20 and 22 of the bird feed container 12 to allow the bird feed container cover 72 to telescope over the top of the bird feed container 12 with the side walls and the end walls inside the outer walls of the bird feed container cover. A roof overhang extends outward past the outer walls 76, 79, 80, and 82 on all four sides. The roof 72 is described above as a simple roof with a pitch and a center horizontal ridge 88. The shape of the roof 72 could be changed to many different shapes and architectural styles to change the appearance of the bird feeder as long as it covers the top of the bird feed container 12.

Figure 7:
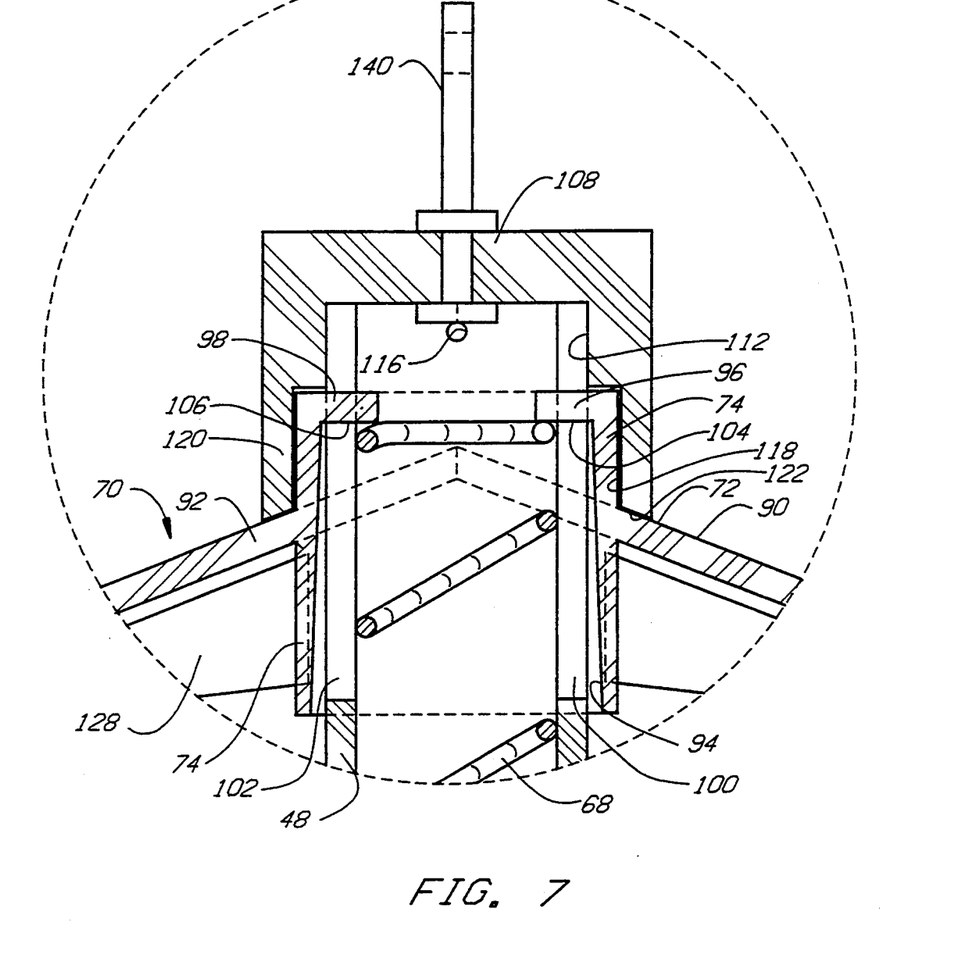
FIG. 7 is an enlarged sectional view of the spring follower, the upper end of the compression spring and the vertical tube and the cap taken at 7 in FIG. 4.

A spring follower 74, which is integral with the roof 72, is mounted in the center portion of the roof of the bird feed container cover 70. Gussets 128 are integral with the spring follower 74 and the roof 72 and reinforce the connection between the roof and the spring follower. The spring follower 74 passes through the roof 72 and has a vertical bore 94 as shown in FIG. 7. The vertical bore 94 is conical with a larger diameter at the bottom than at the top. The vertical tube 48 extends vertically upward through the spring follower 74 to a point above the bird feed container cover 70. A pair of radial projections 96 and 98 extend radially inward from the upward end of the vertical bore 94. The radial projection 96 passes through a vertical slot 100 in the upper end of the vertical tube 48. The radial projection, 98 passes through a vertical slot 102 in the upper end of the vertical tube 48 on the opposite side of the vertical tube from the vertical slot 100. A spring abutment surface 104 on the bottom of the radial projection 96 and a spring abutment surface 106 on the bottom of the radial projection 98 contact the upper end of the coil compression spring 68 and compress the coil compression spring as the radial projections 96 and 98 move downward in the vertical slots 100 and 102. A cap 108 is attached to the top of the vertical tube 48 by a pin 110. The cap 108 has an upper bore 112 extending upward from the bottom and part way through the cap. The upper bore 112 receives the upper end of the vertical tube 48. The pin 110 passes through a horizontal bore 114 drilled through the cap 108 and apertures 116 through the upper end of the vertical tube 48 between the vertical slots 100 and 102. A larger diameter lower bore 118 in the cap 108 than the upper bore 112 extends vertically from the bottom a shorter distance than the upper bore 112. The larger diameter bore 118 forms a skirt 120, The larger diameter bore receives the top of the spring follower 74 and the skirt 120 keeps water from entering the bird feed container 12 through the vertical bore 94, The larger diameter bore 118 is larger than the outside diameter of the spring follower 74 to prevent binding, The bottom of the skirt 120 includes a stop surface 122, The stop surface 122 is normally held in sealing contact with the roof 72 by the coil compression spring 68 to keep water out of the vertical tube 48 and the bird feed container 12 in windy conditions, When a large bird or animal is supported by the roof 72, the coil compression spring 68 is compressed and the roof 72 is moved downward away from the stop surface 122 and the skirt 120 continues to encloses the top of the spring follower 74 to keep water out.

The outer walls 78 and 82 of the bird feed container cover 70 have feed openings 124 and 126. The feed openings 124 and 126 uncover the bird feed access openings 32 and allow birds to remove bird feed from the bird feed container 12 when the coil compression spring 68 is holding the bird feed container cover 70 up and the stop surface 122 on the cap 108 is in contact with the roof 72 and prevents further upward movement of the bird feed container cover. When the weight of a large bird or another animal compresses the coil compression spring 68 and moves the bird feed container cover 70 downward until the radial projections 96 and 98 contact the bottom of the vertical slots 100 and 102, the outer walls 78 and 82 of the bird feed container cover will cover the feed access openings 32 and prevent removal of bird feed from the bird feed container 12. Stop surfaces could be provided on the bird feed container 12 and the bird feed container cover 70 to limit downward movement of the bird feed container cover relative to the bird feed container, if desired. If such stops were provided, the bottoms of the vertical slots 100 and 102 would not be contacted by the projections 96 and 98 to limit downward movement of the bird feed container cover 70.

A bird perch assembly 84 is attached to the outer wall 78 to support one or more birds below the bird feed opening 124. A bird perch assembly 86 is attached to the outer wall 82 to support one or more birds below the feed opening 126. Each bird perch assembly 84 or 86 includes a trough section 130 and at least one perch 132. The trough section 130 is horizontal and directly below the feed opening 124 or 126. Birds can drop bird feed in the trough section 130 and pick it up a second time to eat it. The perch 132 supports birds while they are eating. The perch 132 is parallel to the trough section 130 and spaced outwardly from the trough section. The distance from the perch 132 to a bird feed access opening 32 depends upon the size of the bird that is to use the bird feeder 10. If birds of various sizes are to use the bird feeder, two or even more separate spaced apart parallel perches 132 can be provided.

Figure 5:
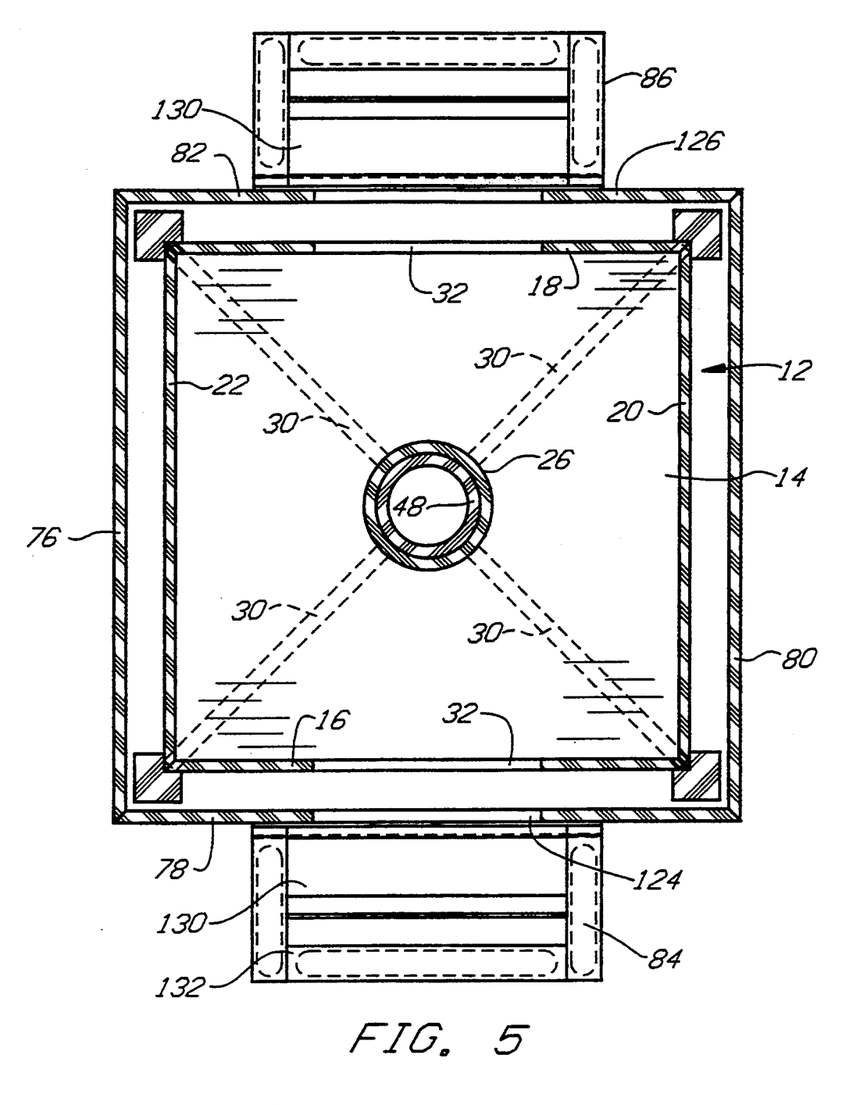
FIG. 5 is a sectional view taken along line 5—5 in FIG. 1.

Bearing blocks 134 are attached to each corner of the bird feed container 12 near the bottom wall 14. The bearing blocks 134 contact the inside surfaces of the outer walls 76, 78, 80, and 82 to limit lateral movement of the bird feed container cover 70 relative to the bird feed container 12. Substantial space must be provided between the outer walls 76, 78, 80, and 82 and the bearing blocks 134, as shown in FIG. 5, to accommodate the taper in the outer walls. The vertical bore 94 in the spring follower 74 is conical to allow the outer walls 76, 78, 80, and 82 to move into contact with the bearing blocks 134 without causing binding between the spring follower 74 and the vertical tube 48. If there is binding between the vertical tube 48 and the spring follower 74, the bird feed container cover 70 will not move vertically relative to the bird feed container 12 and the bird feeder 10 will not be selective.

Figure 9:
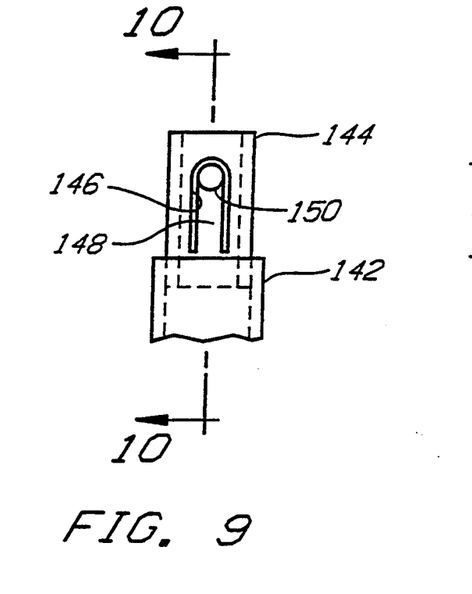
FIG. 9 is an elevational view of the upper end of a bottom support pole.
Figure 10:
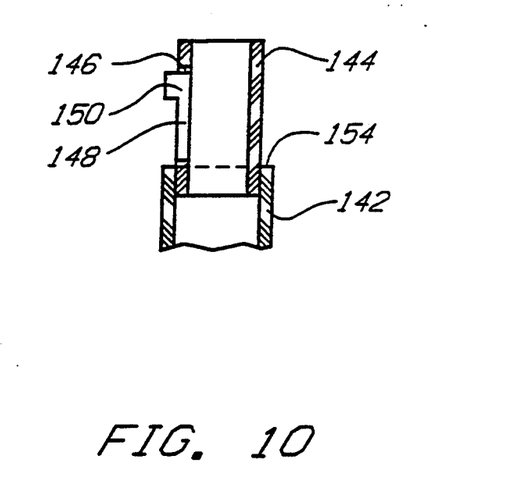
FIG. 10 is a sectional view taken along line 10—10 in FIG. 9.

The bird feeder 10 can be hung by a hook 140 attached to the cap 108. The bird feeder 10 can also be supported by a pole 142, the upper end of which is shown in FIGS. 9 and 10. The pole 142 has its lower end anchored in the ground. A short tube 144 extends from the top of the pole 142, is telescopically received within the pole and is secured to the pole. A slot 146 is cut in a wall of the short tube 144 to form a flexible finger 148. A retaining knob 150 is secured to and protrudes radially outward from the free end of the flexible finger 148. To mount the bird feeder 10 on the pole 142, the short tube 144 is received in the vertical tube 48 and the upper end of the pole 144 is received within the sleeve 26. The retaining knob 150 is depressed radially inward through an aperture 152 so that the knob does not limit movement of the pole 142 into the sleeve 26. The pole 142 is fully inserted within the sleeve 26 when the surface 154 on the top of the pole contacts the bottom of the vertical tube 48 inside the sleeve. When the surface 154 is in contact with the vertical tube 48, the retaining knob 150 can enter an aperture 156 to lock the bird feeder 10 to the pole 142. The bird feeder 10 can be separated from the pole 142 by forcing the retaining knob 150 radially inward and out of the aperture 156 and then lifting the bird feeder off the pole 142. If more security is required, the retaining knob 150 can be raised relative to the pole 142 and an aperture 158 in the vertical tube 48 can be provided inside the bird feed container 12 to receive the retaining knob 150. The bird feeder 10 can only be removed from the pole 142 by pressing the retaining knob 150 out of the aperture 158 inside the bird feed container 12. The bird feeder 10 has to be removed from the pole 142 to adjust the lower spring abutment 50.

The bird feed container 12 is filled with bird feed by removing the pin 110 from the horizontal bore 114 through the cap 108 and the apertures 116 through the upper end of the vertical tube 48. A lanyard 160 attached to the pin 110 and the cap 108 prevents loss of the pin. The upper end of the vertical tube 48 is then removed from the bore 112 and the cap 108. With the cap 108 separated from the vertical tube 48, the bird feed container cover 70 can be lifted vertically up off the bird feed container 12 and the bird feed container can be filled with bird feed. The procedure can be reversed to close the bird feed container.

Figure 11:
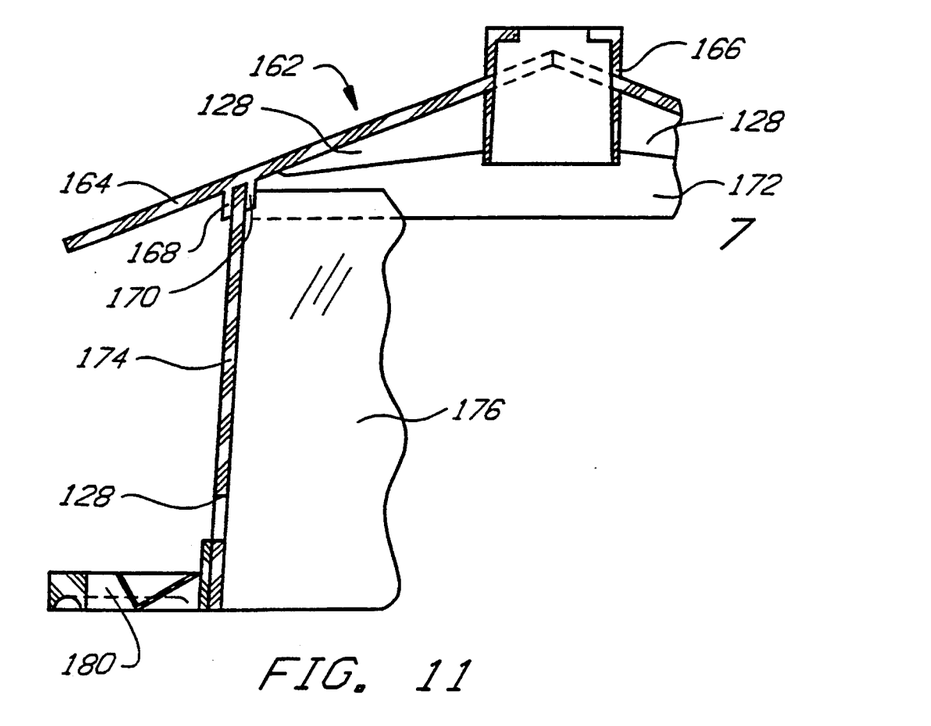
FIG. 11 is a sectional view of a bird feeder container cover with an alternate construction.

An alternate construction of a bird feed container cover 162 is shown in FIG. 11. The bird feed container cover 162 is two injection molded parts that are attached together by adhesive. The first part of the bird feed container cover 162 includes a roof 164 and an integral spring follower 166. The spring follower 166 is identical to the spring follower 74 shown in FIG. 7 and described above. Outer side wall guides 168 and 170 are integral with the roof 164 and extend vertically downward from the lower surface of the roof. A pair of spaced apart gables 172 are injection molded with the roof 172. Gussets 128 integral with the roof 164 and spring follower 166 reinforce the first part of the bird feed container cover 162. The second part of the bird feed container 162 includes two side walls 174 and two end walls 176 that are injection molded in one part. The upper edges of the side walls 174 are each positioned between outer side wall guides 168 and 170 and secured to the roof 164 by an adhesive. The upper edges of the end walls 176 are positioned between the gables 172. The gables 172 and the end walls 176 are attached to each other by an adhesive. Feed openings 178, identical to the feed openings 124 are formed in the two side walls 174. A perch assembly 180 is attached to each of the side walls 174 below the feed opening 178. The perch assemblies 180 are identical to the bird perch assemblies 84 and 86 described above.

The bird feeder 10 has been described above in detail in connection with preferred embodiments. The preferred embodiments are, however, examples only and the invention is not restricted thereto. Those skilled in the art will understand that variations and modifications can be made within the scope of the invention.

I claim:

1. A selective bird feeder comprising: a bird feed container with a bottom wall, at least one side wall attached thereto and forming an open top; at least one bird feed access opening in said side wall of said bird feed container; a generally vertical member, with an upper end and a lower end, secured to said bird feed container; a lower spring abutment supported by said generally vertical member; a spring, with an upper end and a lower end, having its lower end supported by said lower spring abutment; a bird feed container cover having a roof, at least one cover integral wall that telescopes over the at least one side wall of said bird feed container, a bird perch attached to the at least one integral wall of said bird feed container cover; a spring follower integral with the roof and having a vertical bore which receives the upper end of said generally vertical member and permits a portion of said generally vertical member to extend through the vertical bore and project above the spring follower, and a spring abutment surface on the spring follower in contact with the upper end of said spring; a cap attached to the upper end of said vertical member above said spring follower and having a stop surface that limits expansion of said spring and upward movement of the bird feed container cover relative to the bird feed container; a spring tension adjustment assembly mounted in vertical member and adjusting the force exerted by said spring when the stop surface on said cap is preventing upward movement of said bird feed container cover relative to the bird feed container; and wherein a load on said bird feed container cover which overcomes said spring will compress said spring, move the bird feed container cover down and cover said at least one bird feed access opening.

2. A selective bird feeder as set forth in claim 1 wherein the spring tension adjustment assembly comprises an adjuster for supporting the lower spring abutment in selected positions relative to said generally vertical member.

3. A selective bird feeder as set forth in claim 2 wherein said generally vertical member is a tube.

4. A selective bird feeder as set forth in claim 3 wherein the lower spring abutment is supported in selected positions inside said tube.

5. A selective bird feeder as set forth in claim 3 wherein said generally vertical member has at least one slot in its lapper end and the spring follower integral with the roof includes a radial projection that extends through said at least one slot in the generally vertical member, and said spring abutment surface on the spring follower is a surface on said radial projection.

6. A selective bird feeder as set forth in claim 1 wherein said cap is releasably attached to the upper end of said vertical member and said cap is removed from said vertical member to permit removal of said bird feed container cover and subsequent filling of said bird feed container with bird feed.

7. A selective bird feeder, which allows birds of less than an adjustable selected weight to obtain feed while preventing birds and animals with a weight that exceeds said adjustable selected weight from obtaining feed from the feeder, comprising: a bird feed container with a bottom wall, at least one side wall attached thereto and forming an open top; at least one bird feed access opening in said at least one side wall of said bird feed container; a generally vertical tube, with an upper end and a lower end, secured to said bird feed container and at least one vertical slot in the upper end of said generally vertical tube; a lower spring abutment mounted inside said generally vertical tube; a spring, with an upper end and a lower end, retained within said generally vertical tube with its lower end in contact with said lower spring abutment and extending upwardly from said lower spring abutment; a bird feed container cover having a roof, at least one integral wall that telescopes over the at least one side wall of said bird feed container, a bird perch attached to the at least one integral wall of said bird feed container cover for supporting a bird taking bird feed from said bird feed container through the bird feed access opening, and wherein said bird feed container cover covers the open top and at least part of the at least one side wall of said bird feed container; a spring follower integral with the roof and having a vertical bore which receives the upper end of said generally vertical tube and permits a portion of said generally vertical tube to extend through the vertical bore and project above said spring follower, at least one radial projection within the vertical bore, that is integral with said spring follower and that passes through the at least one vertical slot in the upper end of said generally vertical tube, and a spring abutment surface on the at least one radial projection in contact with the upper end of said spring; a cap releasably attached to the upper end of said vertical tube above said spring follower and having a stop surface that contacts said bird feed container cover to limit expansion of said spring and upward movement of the bird feed container cover relative to the generally vertical tube; a spring tension adjustment assembly mounted in said vertical tube and adjusting the position of said lower spring abutment relative to the spring abutment surface in contact with the upper end of said spring when the stop surface on said cap is in contact with said bird feed container cover; and wherein the at least one vertical slot in the upper end of said generally vertical tube allows the at least one radial projection to move downward in the at least one vertical slot, compress said spring and allow said bird feed container cover to move away from the stop surface on said cap in response to the weight of a large bird or other animal that exceeds the adjustable selected weight until the at least one integral wall of said bird feed container cover covers the bird feed access opening in the at least one side wall of said bird feed container thereby preventing the removal of bird feed from said bird feed container until the weight on said bird feed container cover is reduced and the spring moves said bird feed container cover toward said cap.

8. A selective bird feeder as set forth in claim 7 wherein said lower spring abutment is vertically adjustable in said generally vertical tube.

9. A selective bird feeder as set forth in claim 8 wherein said lower spring abutment has fingers with teeth, said teeth engage fixed teeth inside said generally vertical tube.

10. A selective bird feeder as set forth in claim 7 wherein said cap has a downwardly projecting flange that surrounds an upper part of the spring follower and keeps water out of said generally vertical tube and out of said vertical bore through said spring follower.

11. A selective bird feeder as set forth in claim 10 wherein the stop surface on said cap is on the downwardly projecting flange and said stop surface seals against a surface on said bird feed container cover when said bird feed container cover is held against said cap by said spring.

12. A selective bird feeder as set forth in claim 7 wherein said bird feed container has multiple side walls and said bird feed container cover has multiple integral walls.

13. A selective bird feeder as set forth in claim 12 wherein said bird feed container has bird feed access openings in at least two side walls of said bird feed container.

14. A selective bird feeder as set forth in claim 13 including a bird perch attached to each integral wall of said bird feed container cover that is adjacent to one of the side walls of said bird feed container with at least one of said bird feed access openings.

15. A selective bird feeder as set forth in claim 14 wherein each bird perch includes a feed trough for catching feed dropped by birds.

16. A selective bird feeder as set forth in claim 12 wherein the side walls of said bird feed container are tapered and extend upwardly and outwardly from said bird feed container bottom wall and the integral walls of said bird feed container cover are tapered and extend downwardly and outwardly from said roof.

17. A selective bird feeder as set forth in claim 7 wherein the vertical bore through said spring follower is conical.

18. A selective bird feeder as set forth in claim 7 including bearing blocks between the at least one side wall of said bird seed container and the at least one integral wall of said bird seed container cover for reducing horizontal movement of said bird seed container cover relative to said bird seed container.

19. A selective bird feeder as set forth in claim 7 including a feeder insert, with at least one vertical slot, mounted in a bird feed access opening in said bird feed container.

20. A selective bird feeder comprising: a bird feed container with a bottom wall, at least one side wall attached thereto forming an open top; at least one bird feed access opening in said side wall of said bird feed container; a generally vertical member, with an upper end and a lower end, secured to said bird feed container; a lower spring abutment supported by said generally vertical member; a spring, with an upper end and a lower end, having its lower end supported by said lower spring abutment; a bird feed container cover having a roof, at least one cover integral wall that telescopes over the at least one side wall of said bird feed container, a bird perch attached to the at least one integral wall of said bird feed container cover; a spring follower integral with the roof and having a vertical bore which receives the upper end of said generally vertical member and permits a portion of said generally vertical member to extend through the vertical bore and project above the spring follower, and a spring abutment surface on the spring follower in contact with the upper end of said spring; a cap attached to the upper end of said vertical member above said spring follower and having a stop surface that limits expansion of said spring and upward movement of the bird feed container cover relative to the bird feed container; and wherein a load on said bird feed container cover which overcomes said spring will compress said spring, move the bird feed container cover down and cover said at least one bird feed access opening.

* * * * *

UNITED STATES PATENT AND TRADEMARK OFFICE
CERTIFICATE OF CORRECTION

PATENT NO. : 5,445,109
DATED : August 29, 1995
INVENTOR(S) : Donald F. Gray et al.

It is certified that error appears in the above-indentified patent and that said Letters Patent is hereby corrected as shown below:

Column 9, line 31, change "lapper" to -- upper --.

Signed and Sealed this

Nineteenth Day of March, 1996

Attest:

BRUCE LEHMAN

Attesting Officer   Commissioner of Patents and Trademarks